United States Patent [19]
Ross

[11] 3,838,257
[45] Sept. 24, 1974

[54] CONTROL SYSTEM FOR MINIMIZING BOTH THE CONTROL ERROR AND THE INTEGRAL OF THE CONTROL ERROR

[75] Inventor: Charles W. Ross, Hatboro, Pa.

[73] Assignee: Leeds & Northrup Company, North Wales, Pa.

[22] Filed: Nov. 6, 1972

[21] Appl. No.: 304,029

[52] U.S. Cl............ 235/151.1, 235/150.1, 318/610
[51] Int. Cl............................................. G05b 11/42
[58] Field of Search ......... 318/610, 621; 235/150.1, 235/150, 151.1, 151.12

[56] References Cited
UNITED STATES PATENTS

| | | | |
|---|---|---|---|
| 2,946,943 | 7/1960 | Nye et al. ...................... | 318/610 X |
| 3,566,241 | 2/1971 | Ross................................ | 318/610 X |
| 3,758,762 | 9/1973 | Littman et al. .................. | 235/150.1 |
| 3,767,900 | 10/1973 | Chao et al. ...................... | 235/151.1 |

Primary Examiner—Rudolph V. Rolinec
Assistant Examiner—William D. Larkin
Attorney, Agent, or Firm—William G. Miller, Jr.; Raymond F. MacKay

[57] ABSTRACT

A standard feedback control system is supplemented by a modification of the manipulated variable in proportion to the product of the error and the reciprocal of the absolute value of the process gain. That supplementary control, which minimizes the integral of the control error in a minimum time, is prevented from affecting the feedback control response by a modification of the error so that changes in the controlled variable resulting from the supplementary control will not affect the effective error input to the feedback controller. This compensation of the error is produced by using a process model responsive to the supplementary control for modifying the error signal.

7 Claims, 3 Drawing Figures

CONTROL SYSTEM FOR MINIMIZING BOTH THE CONTROL ERROR AND THE INTEGRAL OF THE CONTROL ERROR

BACKGROUND OF THE INVENTION

In control systems used in the control of processes involving the storage of a product whose characteristic is the controlled variable, it is usually difficult to control that characteristic in the material stored since the material input will usually show variations in the characteristic being controlled. Thus, the integral of the deviation of the characteristic being controlled will show up in the stored material. A typical example of this problem is the filling of a storage vessel wherein deviations in component feed rates or the composition being fed into the vessel can be limited by conventional control methods. Even when using such control methods there are fluctuations of the component feed rate or its composition, whichever is being controlled. These fluctuations accumulate in the storage vessel and show up as deviations of the blended product from its desired composition. The deviation of the final composition from its desired value in the filled storage vessel is thus represented by the accumulation of the fluctuations from set point of the feed rate of the blended components or the composition of the component feed. Thus, the storage vessel in this case is an integrator of the feed inputs. The storage vessel may also include continuous stirring and out flow in which case it becomes a first order lag instead of an integrator.

One way which has been used to control the storage vessel composition involves the use of two proportional plus reset controllers in series. The first of the controllers would function to control the feed rate fluctuations and the second would function to control the storage fluctuations. The integral or reset action in the first controller which integrates the feed rate fluctuations actually represents the accumulated composition of the blend in the storage vessel. The second controller controls the storage composition by operating to reduce the integrated error to which the first controller is responsive.

SUMMARY OF THE INVENTION

This invention relates to a process control system for minimizing both the deviation from set point of a directly controlled variable of a process and the integral of the deviation. The integral is returned to zero in a minimum time period. The system includes a feedback control loop having a controller responsive to the deviation for modifying a manipulated variable so as to return the controlled variable of the process to its set point. The improvement which constitutes this invention comprises a supplementary controller responsive to the effective error signal to which the feedback controller responds so that the supplementary controller is operable to modify the manipulated variable in proportion to that effective error signal. The improvement also includes means for producing the effective error signal by modifying the error signal so as to substantially cancel the change in the error signal expected as a result of the effect on the controlled variable of the modification of the manipulated variable by the supplementary controller.

DESCRIPTION OF THE PREFERRED EMBODIMENTS

Figure 1:
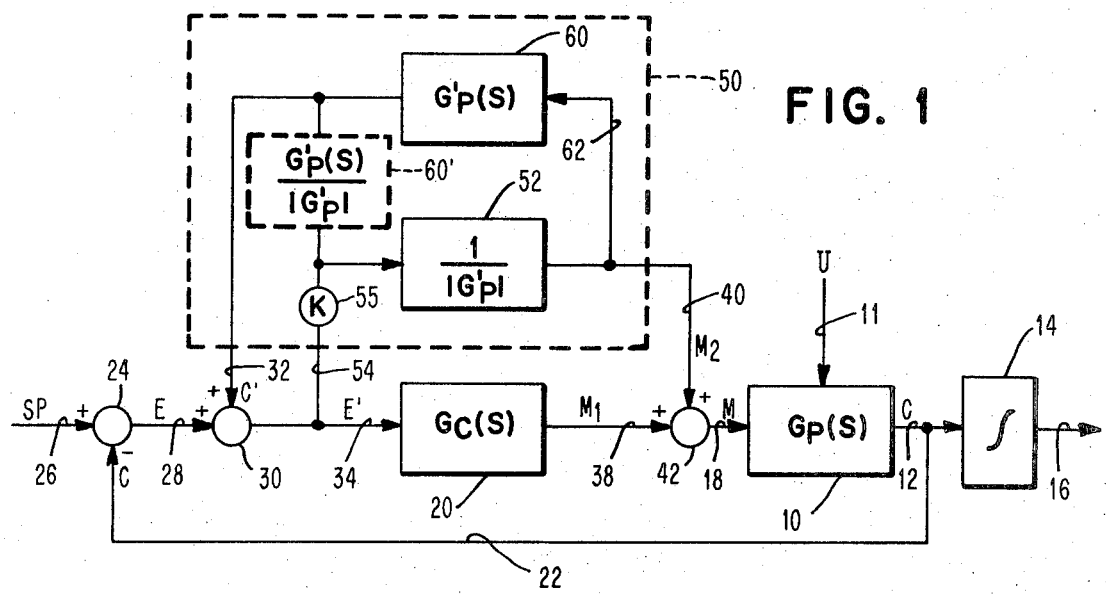
FIG. 1 is a block diagram of an analog control system which utilizes this invention.

In FIG. 1 the process 10 is shown as having its dynamics expressed as a Laplace transform $G_p(s)$. These dynamics may include measurements as well as process characteristics. The process is shown as being subjected by way of line 11 to disturbances U which may cause variations in the controlled variable C, shown as an output on line 12. The controlled variable may, for example, be a particular characteristic of the blended product being stored in a storage vessel 14 which would then effectively integrate that characteristic of the blend as it is stored. The storage vessel 14 may or may not include an output flow by way of line 16.

The process 10 is shown with a single input on line 18 constituting a manipulated variable of the process, which manipulated variable may, for example, control the feed rate of a particular constituent of the blend. It will be understood that the disturbances U, which are shown as being introduced to the process 10 by way of line 11, may be introduced at any point in the process.

For the purpose of controlling the magnitude of the controlled variable C there is provided a feedback control system which includes the controller 20 whose dynamics are expressed in Laplace form as $G_c(s)$. For the purpose of providing for a control of the controlled variable on line 12, a signal representing the measured value of that variable is fed back by way of line 22 to the summing junction 24 where it is compared with the set point signal SP which is supplied by way of line 26 to the summing point 24. This set point may be subject to manipulate by another controller (not shown) which may derive its input from the storage vessel output characteristic on line 16. As a result of the comparison at point 24 there is produced a signal representing the deviation of the controlled variable from the set point. That deviation, which is expressed as an error signal E, appears as an output of the summing junction 24 on line 28.

The error signal on line 28 is introduced as one input to the summing junction 30, the other input being by way of line 32 and being a signal representative of a quantity C' which will be discussed later. If for the purpose of explanation, we consider that the value C' is zero, then the effective error signal E', which appears as an output of summing junction 30 on line 34, will be equal to the error signal E on line 28, and the feedback controller 20 which receives the effective error signal on line 34 as an input will produce as an output on line 38 a value for the manipulated variable of the process, which value is shown as $M_1$. In FIG. 1 the value $M_1$ is added to the value $M_2$ of a modifying signal supplied on line 40 to the summing junction 42 at which point $M_1$ and $M_2$ provide an output for the summing junction 42 representing the manipulated variable of the process 10 and having a magnitude M.

Assuming that the value of $M_2$ is zero and that the value of $C'$ is zero, the process 10 is then subjected to the normal feedback control actions which may include proportional and reset, plus rate action where that may be necessary, so that the value of the controlled variable C is maintained as nearly as possible in equality with the set point value, or in other words so that the deviations of the controlled variable from its set point are minimized.

It will be appreciated that any deviations of the value of the controlled variable C from the set point SP will be accumulated in the storage vessel 14 due to the integrating effect that storage vessel produces. Thus, while the normal feedback control system described above may be capable of maintaining the value of the controlled variable within close limits, there will nevertheless be deviations, however small, of that controlled variable from its desired value and hence the blend accumulated in the storage vessel 14 may deviate by a significant amount from the specified blend in spite of the close control of the blending process 10. It is, therefore, desirable to compensate for inadvertent deviations of the controlled variable by signals tending to effect deviations of an opposite sense so that the accumulated product in the storage vessel 14 may be a blend which meets the required specifications established by the set point SP.

To accomplish this compensatory tendency there is added to the feedback control system of FIG. 1, a supplementary controller for modifying the control system. This supplementary controller is shown in block 50. The supplementary controller is represented by block 52, which has as an input from line 54 the effective error signal $E'$, which is supplied by way of potentiometer 55 and which supplies as an output on line 40 a signal for modifying the manipulated variable, namely the signal $M_2$. The constant K represented by the setting of potentiometer 55 is a constant which may be arbitrarily selected by the user, and would be particularly useful for systems in which the dynamics of the storage vessel 14 are of the same order as the dynamics of the process 10. $M_2$ adds to or modifies the signal $M_1$ to produce the resulting manipulated variable M. The controller 52, as shown in FIG. 1, provides the signal $M_2$ in direct proportion to the effective error signal $E'$ with the proportionate relationship being equal to the reciprocal of the absolute value of the process gain. Thus, the signal supplied on line 54 is multiplied by the reciprocal of the absolute value of the process gain in the controller 52 to produce the modifying signal $M_2$ which has the effect of causing the manipulated variable M to control the process 10 so that the integral of the error E is minimized in a minimum amount of time.

It is desirable upon modification of the manipulated variable $M_1$ by the signal $M_2$ to attempt to prevent the feedback controller 20 from responding to any variations in the controlled variable C which might result from variations in the value of $M_2$ and therefore, there is utilized a means for modifying the error signal E both in direction and extent so as to cancel the effect on that error signal of actions due to the supplementary control action effected by the modifying control signal $M_2$. That modification of the error signal is in one form produced by means of a circuit operable to model the process 10. That form of the circuit is shown in FIG. 1 as block 60 whose dynamics are indicated as being expressed as the Laplace transform $G'_p(s)$. The process model 60 receives as its input the signal $M_2$ over line 62 and produces an output on line 32, indicated as a signal $C'$, which is the signal which serves to modify the error signal E to produce the effective error signal $E'$ by way of the summation produced at summing junction 30 in FIG. 1. The process model 60 may be replaced by the model 60' which models the dynamics of the process and is represented in Laplace form as $G'_p(s)/|G'_p|$. This substitution for line 62 and block 60 is shown in dotted line connected between potentiometer 55 and line 32. Thus, this model of the process dynamics is responsive to the effective error signal.

Figure 2:
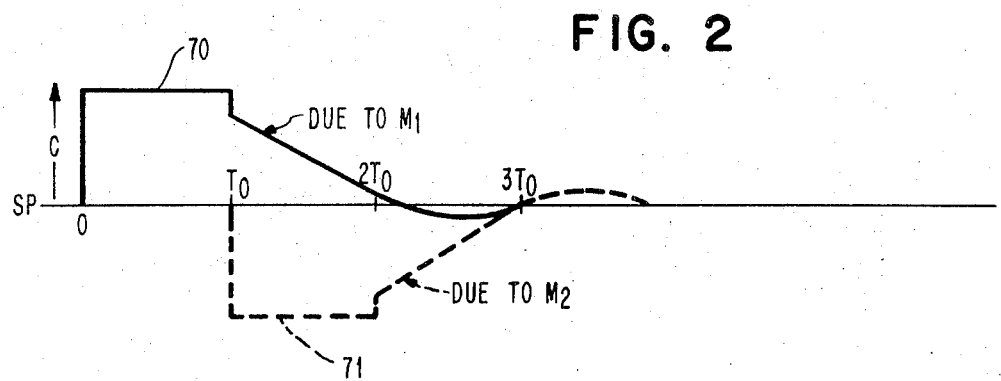
FIG. 2 is a graphical representation of the response of the novel control system when the dynamics of the process being controlled involve only a dead time.

The operation of the novel control system of FIG. 1 may be most readily illustrated if it is assumed that the process 10 is under the control of a proportional plus integral controller with the process dynamics consisting of pure dead time. When that is the case, the response of the controlled variable C, due to a step disturbance to the process, is illustrated by the solid line 70, shown in FIG. 2, where the proportional action of the feedback controller affects the controlled variable C after one dead time period has elapsed. The proportional action of the controller 20 of FIG. 1 causes the step change at $T_0$ and the reset action of the controller then effects a gradual return of the controlled variable to the desired value as represented by the set point SP. This return may occur during the time period $3T_0$.

By means of the modifying signal $M_2$ as supplied by the controller 52, the controlled variable C will be caused to change in a compensatory fashion so that the integral of the change in C resulting from the signal $M_1$ will be canceled by the integral of the change in C resulting from the signal $M_2$. Thus, as shown by the dotted line 71, the response due to $M_2$ is a mirror image of the response due to $M_1$ and as a result the integral of the deviations of the controlled variable C from its set point are minimized in a minimum time and the deviation of the blended product in the storage vessel 14 from its desired specifications is minimized. In other words, the integral of the deviation of the controlled variable is minimized.

Figure 3:
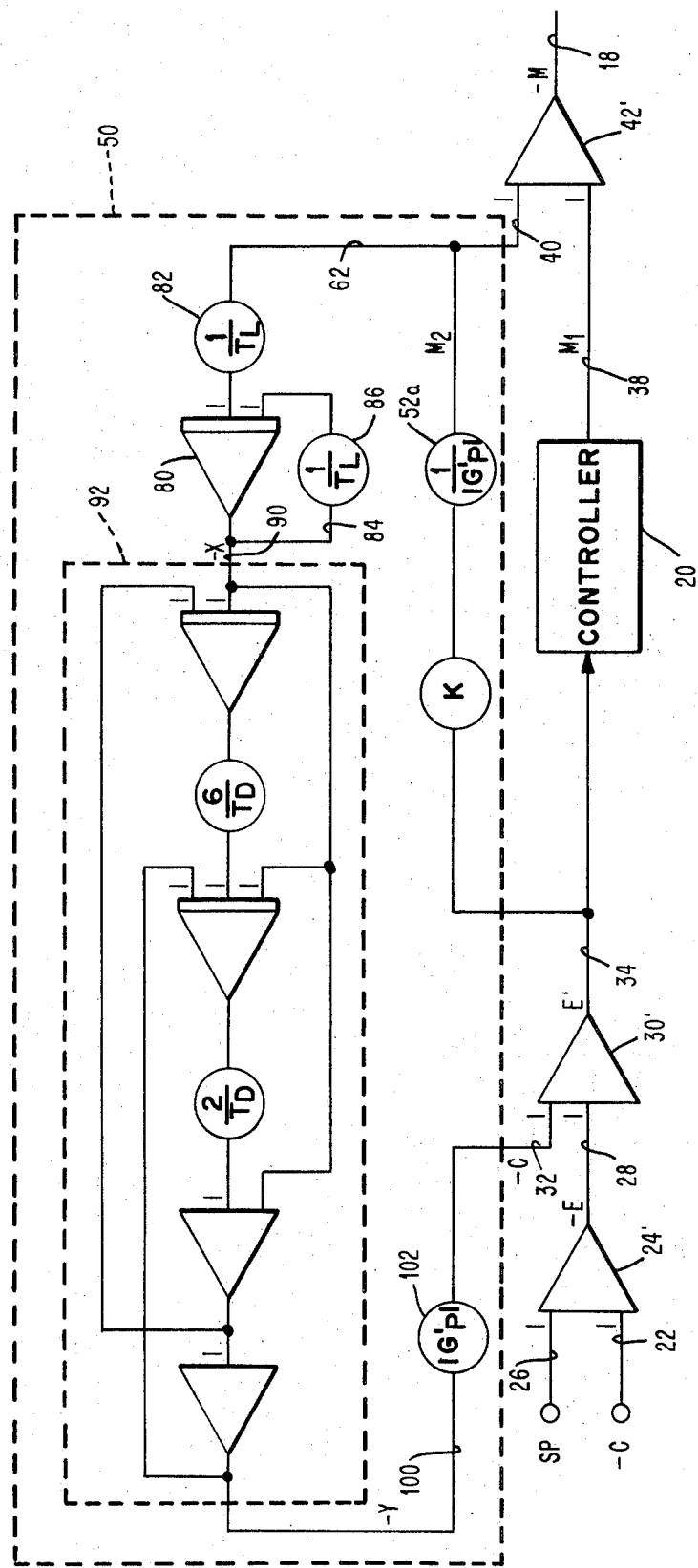
FIG. 3 is an analog control system showing one form of analog circuit which can be utilized to carry out the functions of the block diagram of FIG. 1.

In FIG. 3 there is shown an analog circuit for the control system of FIG. 1. In FIG. 3 the feedback controller 20 is represented by block 20, for that controller may be any one of a number of standard controllers capable of supplying proportional and reset, plus rate action, as desired. The effective error signal to which the feedback controller 20 responds is supplied on line 34 as a signal $E'$. That signal is derived from a summation of the error signal $-E$ and the signal $-C'$ supplied respectively on the lines 28 and 32 to the summing amplifier 30'. As shown, the error signal $-E$ is the output of the summing amplifier 24' whose inputs are the set point value SP, supplied on line 26, and the controlled variable C with a negative polarity as supplied on line 22. Both the amplifiers 24' and 30' are polarity inverting amplifiers as is evident from the signal polarities in FIG. 1. Likewise, all other amplifiers of FIG. 3 are considered to be polarity inverting.

The output of the controller 20, namely the signal $M_1$ on line 38, is summed with the signal $M_2$ on line 40 by introducing those two signals as inputs to the summing amplifier 42' whose output on line 18 is the manipulated variable M with a negative polarity.

In FIG. 3 the controller 52 of FIG. 1 is shown as a potentiometer 52a which introduces a proportional factor equal to the reciprocal of the absolute value of the process gain or in other words the reciprocal of the steady state process gain, $1/|G'_p|$. The signal $M_2$ produced by 52a is supplied by way of line 62 to the circuitry representing a model of the process being controlled. In FIG. 3 it has been assumed that the process being controlled includes a first order lag as well as a dead time and hence that process is modeled by a circuit which introduces both a first order lag and the dead time of the process. The circuit introducing the first order lag is represented by the integrating amplifier 80 and its input potentiometers 82 on line 62, the potentiometer 82 has a setting corresponding with the reciprocal of the time lag to be represented, $1/T_L$. The integrating amplifier 80 is also supplied with a feedback circuit including line 84 and potentiometer 86. The potentiometer is adjusted to have a setting corresponding with that of potentiometers 82. The output provided by the circuit producing the first order lag is a signal −X shown on line 90 and that signal is shown as an input to the block 92 which includes the dead time circuit, here shown as a Pade type dead time circuit. The circuit of block 92 may be better understood by reference to page 422 of the book entitled "Analog Computing in Engineering Design," authored by Rogers and Connolly, and published by McGraw-Hill in 1960. It is understood by those skilled in the art that the necessary dead time can be produced in other ways such as by a tape recorder having displaced "read" and "record" heads.

The output of the dead time circuit 92 is shown on line 100 as a signal −Y which is then multiplied by the absolute value of the process gain $|G'_p|$ by means of the potentiometer 102 to produce the signal −C' on line 32.

The invention described above in the form of an analog control circuit may also be carried out by digital means through the use of a digital computer of the general purpose type if the computer is programmed to carry out the same functions as those carried out by the analog circuit described above. A Fortran program for implementing this invention by means of a general purpose digital computer is set forth below.

```
C FORTRAN IMPLIMENTATION OF CONTROL-
    LER
C CONTROLLER IS ALREADY INITIALIZED
    AND RUNNING -
C NO AUTO-MANUAL OR TUNING FEATURES
    ARE GIVEN
C E IS ERROR SIGNAL
C C IS MEASURED VARIABLE
C M IS CONTROLLER OUTPUT(MANIPULATED
    VARIABLE)
C KP IS PROPORTIONAL GAIN OF CONTROL-
    LER
C TI IS INTEGRATION TIME OF CONTROLLER
C TC IS CONTROLLER SAMPLING OR COMPU-
    TATION PERIOD
C TL IS PROCESS FIRST ORDER LAG TIME
C TD IS PROCESS DEAD TIME
C I IS POINTER TO DEAD TIME TABLE
C GPP IS ABSOLUTE VALUE OF PROCESS GAIN
    REAL KP,M1,M2,M
    DIMENSION TABLE(100)
    MAX=TD/TC
    IF(MAX−1)3,4,4
  3 MAX=1
  4 FL=EXP(−TC/TL)
C COMPUTE ERROR SIGNAL
    E=SP−C
C COMPUTE MODIFIED ERROR SIGNAL
    Y=TABLE(I)
    EP=E+GPP*Y
C CONVENTIONAL CONTROLLER--COMPUTE
    INTEGRAL ACTION
    R=R+(KP*TC/TI)*EP
C CONVENTIONAL CONTROLLER--COMPUTE
    PROPORTIONAL & INTEGRAL
    M1=KP*EP+R
C COMPUTE MODIFYING CONTROL ACTION
    M2=EP/GPP
C MODEL OF FIRST ORDER LAG OF PROCESS
    X=(1.−FL)*M2+FL*X
C MODEL OF PROCESS DEAD TIME
C THIS IS A MOVABLE POINTER TABLE
    TABLE(I)=X
    I=I+1
    IF(I−MAX)19,19,18
 18 I=1
 19 CONTINUE
C FORM TOTAL CONTROLLER ACTION
    M=M1+M2
C OUTPUT TO PROCESS
    END
```

What is claimed is:

1. In a process control system for minimizing an error signal representing the deviation of a controlled variable from its set point and for simultaneously minimizing the integral of that deviation in a minimum time, which system includes a feedback control loop having a controller responsive to the error for modifying a manipulated variable so as to return said controlled variable to said set point, the improvement which comprises:

a supplementary controller responsive to an effective error signal so that said supplementary controller is operable to modify the manipulated variable in accordance with a function of the effective error signal so as to produce a change in the controlled variable of magnitude and extent to minimize said integral, and means for producing said effective error signal by modifying said error signal so as to substantially cancel the change in the error signal expected as a result of the effect on said controlled variable of the modification of the manipulated variable by said supplementary controller.

2. A process control system as set forth in claim 1 in which the supplementary controller is a proportional controller whose proportional gain is equal to the reciprocal of the absolute value of the process gain.

3. A process control system as set forth in claim 1 in which the supplementary controller is a proportional controller whose proportional gain is equal to the reciprocal of the absolute value of the gain of the process and the means for producing the effective error signal is a model of the process whose input is the output of said supplementary controller.

4. A process control system as set forth in claim 1 in which the supplementary controller is a proportional controller whose proportional gain is equal to the reciprocal of the absolute value of the gain of the process and the means for producing the effective error signal is a model of the dynamics of the process which model has its input derived from the effective error signal.

5. The method of controlling both an error signal representing the deviation of a controlled variable of a process from set point and the integral of said error signal so as to minimize both said deviation and its integral in a minimum time period, comprising the steps of:

automatically modifying by feedback control action a manipulated variable of the process in direction and extent to minimize an effective error signal to which said feedback control is responsive, automatically modifying the manipulated variable by supplementary control action in proportion to the effective error signal, said proportion being of magnitude proportional to the reciprocal of the absolute value of the gain of the process, and automatically producing said effective error signal by modifying the error signal in direction and extent such that the effective error signal is not changed substantially as a result of the changes in the error signal due to changes in the controlled variable produced by said supplementary control action.

6. The method of claim 5 in which the modification of the error signal is determined by a model of the process, said model being operative to modify the error signal in response to the direction and extent of the supplementary control action.

7. The method of claim 5 in which the modification of the error signal is determined by a model of the process dynamics, said model being operative to modify the error signal in response to a function of the effective error signal.

* * * * *